United States Patent
Yu et al.

(10) Patent No.: US 8,625,940 B2
(45) Date of Patent: Jan. 7, 2014

(54) LIGHT GUIDE DEVICE AND MANUFACTURING METHOD THEREOF

(75) Inventors: Tai-Cherng Yu, New Taipei (TW); Da-Wei Lin, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 114 days.

(21) Appl. No.: 13/420,548

(22) Filed: Mar. 14, 2012

(65) Prior Publication Data

US 2013/0148924 A1    Jun. 13, 2013

(30) Foreign Application Priority Data

Dec. 7, 2011    (TW) .............................. 100145148 A

(51) Int. Cl.
    *G02B 6/26*    (2006.01)
    *G02B 6/42*    (2006.01)

(52) U.S. Cl.
    USPC .......................................................... 385/27

(58) Field of Classification Search
    USPC .......................................................... 385/27
    See application file for complete search history.

(56) References Cited

U.S. PATENT DOCUMENTS 6,324,011 B1 * 11/2001 Higuchi ..................... 359/627
2005/0185915 A1 * 8/2005 Yu et al. ..................... 385/146

FOREIGN PATENT DOCUMENTS

JP    2003084276 A *    3/2003    ............... 349/114

* cited by examiner

*Primary Examiner* — Ryan Lepisto
*Assistant Examiner* — Jerry Blevins
(74) *Attorney, Agent, or Firm* — Altis Law Group, Inc.

(57) ABSTRACT

A light guide device includes a light guide plate, a diffusion layer, and a brightening layer. The light guide plate includes a first surface, a second surface opposite to the first surface, and diffusion pots positioned on the first surface. The diffusion layer is adhered to the second surface of the light guide plate, and includes transparent adhesive and diffusion particles scattered in the transparent adhesive. The brightening layer is adhered to the diffusion layer, and includes a micro structure formed on a surface of the brightening layer facing away from the diffusion layer. The micro structure includes a number of cutouts. A manufacturing method for the light guide device is also provided.

7 Claims, 2 Drawing Sheets

LIGHT GUIDE DEVICE AND MANUFACTURING METHOD THEREOF

BACKGROUND

1. Technical Field

The present disclosure relates to a light guide device and a manufacturing method for the light guide device.

2. Description of Related Art

Many light guide devices include a reflective sheet, a light guide plate, and a diffusion plate stacked together. Air gaps may be formed between the components as they are stacked together, which can reflect light and result in poor light transmission.

What is needed, therefore, is a light guide device, which overcomes the limitations described above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
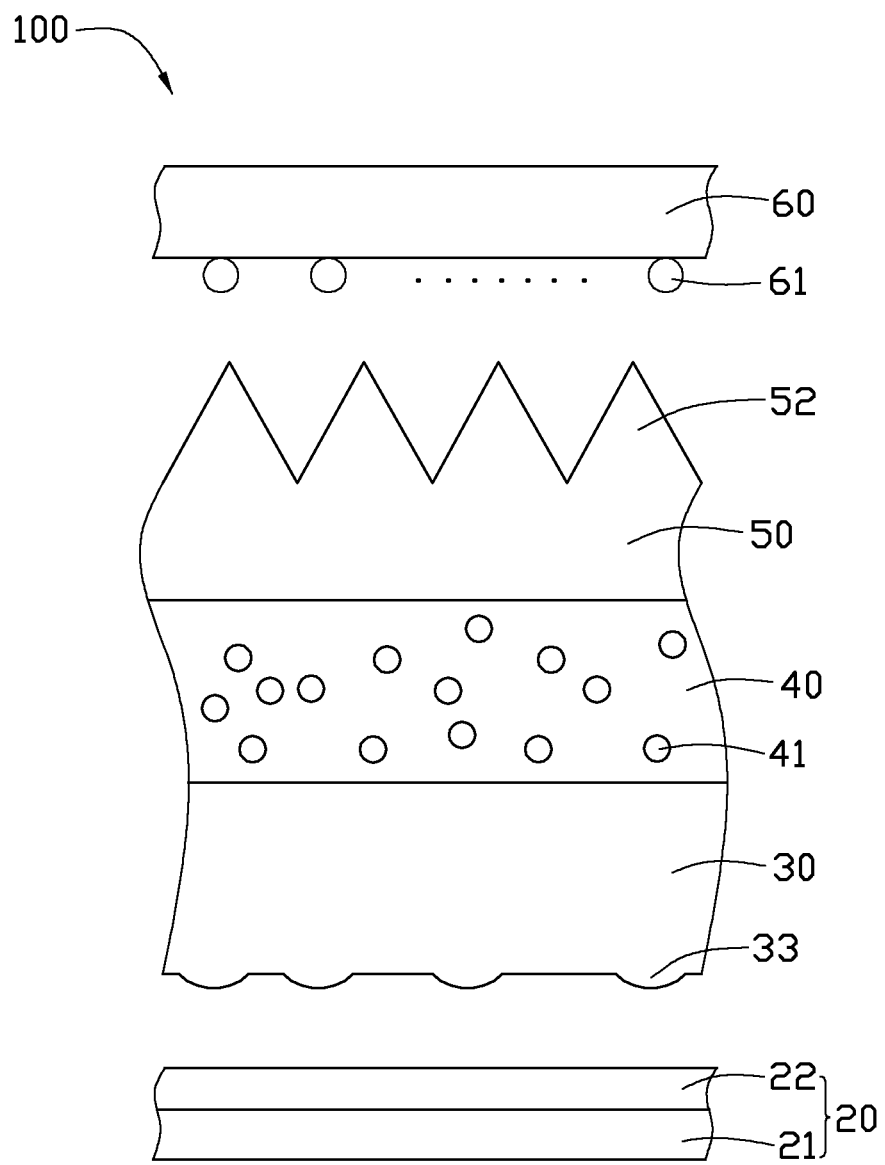
FIG. 1 is a schematic, sectional view of a light guide device according to an embodiment.

Referring to FIG. 1, a light guide device 100 according to an embodiment is shown. The light guide device 100 includes a reflective sheet 20, a light guide plate 30, a diffusion layer 40, a brightening layer 50, and a diffusion film 60.

The reflective sheet 20 includes a transparent substrate 21 and a reflective film 22 coated on the transparent substrate 21. The transparent substrate 21 is made of, for example, polycarbonate (PC). The reflective film 22 is made of highly reflective material, such as aluminum or barium sulphate. The diffusion film 60 is a transparent film coated with diffusion particles 61. The transparent film is made of, for example, polyethylene terephthalate (PET). The diffusion particles 61 are made of, for example, polystyrene (PS). The reflective sheet 20 and the diffusion film 60 are made and used in ways familiar to one skilled in the art, thus, a detailed description is omitted here.

The light guide plate 30 is transparent. Diffusion dots 33 are formed on a bottom surface of the light guide plate 30 and face the reflective film 22. The diffusion layer 40 is adhered to a top surface of the light guide plate 30 opposite to the bottom surface. The diffusion layer 40 is made of a transparent adhesive, for example, a silicone-based adhesive. Diffusion particles 41 may be diffused in the transparent adhesive before forming the diffusion layer 40. The brightening layer 50 is adhered to the diffusion layer 40. The brightening layer 50 is a transparent film. A micro structure 52 for brightening is formed on the surface of the brightening layer 50 opposite to the diffusion layer 40. In this embodiment, the micro structure 52 includes a number of V-shaped cutouts.

The light guide plate 30 and the brightening layer 50 are made of polymethylmethacrylate (PMMA), polycarbonate (PC), or polyethylene terephthalate (PET).

Figure 2:
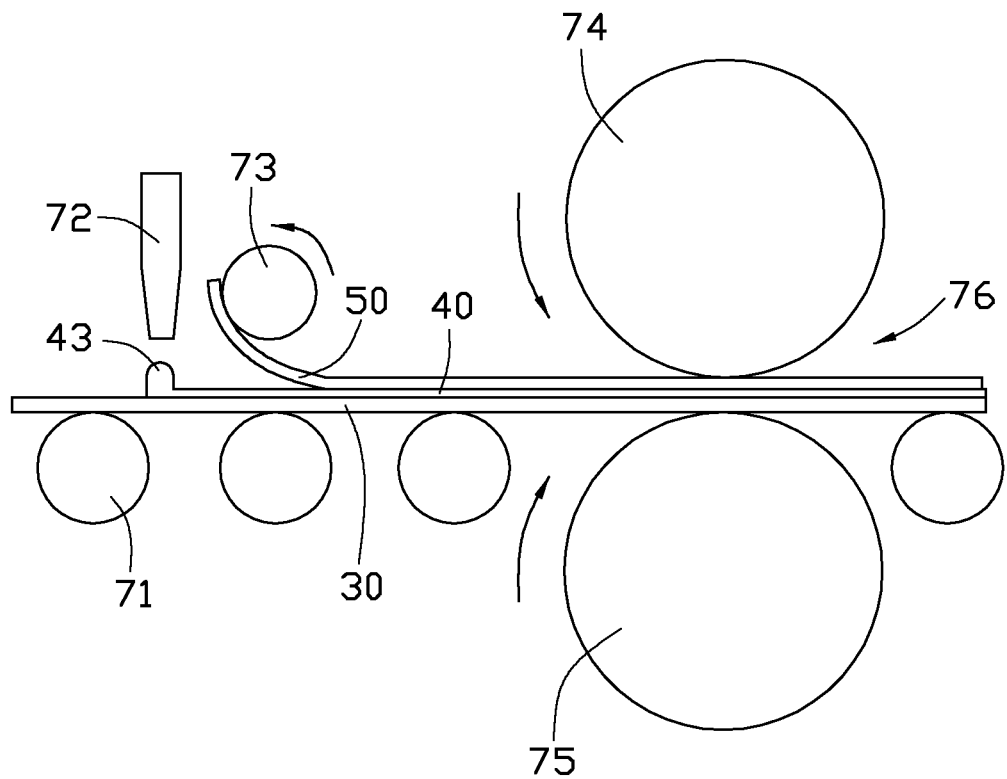
FIG. 2 is a schematic view showing a method of manufacturing the light guide device of FIG. 1.

Referring to FIG. 2, a manufacturing method of the light guide device 100 is shown. The manufacturing method of the reflective sheet 20 and the diffusion film 60 is not shown in FIG. 2 as these two components can be independently manufactured and their manufacturing method are familiar to one skilled in the art.

When manufacturing, the light guide plate 30 is put on a transmission device 71, adhesive 43 mixed with diffusion particles 41 is dispensed on the light guide plate 30 by a gluing machine 72 for forming the diffusion layer 40. The brightening layer 50 coiled around a shaft 73 is put on the diffusion layer 40 by rotating the shaft 73. The light guide plate 30 and the brightening layer 50 are softened by heat. In this embodiment, the heating temperature is in the range of about 130° C. to about 160° C. The transmission device 71 drives the softened light guide plate 30, the diffusion layer 40, and the softened brightening layer 50 to pass through a gap 76 existing between rollers 74, 75. A number of V-shaped cutouts are formed in the roller 74. A number of depressions are formed in the roller 75. The rollers 74, 75 rotate to press the light guide plate 30, the diffusion layer 40, and the brightening layer 50 tightly together to eliminate gaps existing therebetween, to form the micro structure 52 on the brightening layer 50, and to form the diffusion pots 33 on the light guide plate 30. At last, the light guide plate 30, the diffusion layer 40, and the brightening layer 50 are cooled and hardened to complete the manufacturing method.

As no gap exists between the light guide plate 30, the diffusion layer 40, and the brightening layer 50, light transmission loss between the common boundary of the light guide plate 30, the diffusion layer 40, and the brightening layer 50 is minimized.

It will be understood that the above particular embodiments are shown and described by way of illustration only. The principles and the features of the present disclosure may be employed in various and numerous embodiments thereof without departing from the scope of the disclosure. The above-described embodiments illustrate the scope of the disclosure but do not restrict the scope of the disclosure.

What is claimed is:

1. A light guide device, comprising:
    a light guide plate comprising a first surface, a second surface opposite to the first surface, and diffusion pots positioned on the first surface;
    a diffusion layer adhered to the second surface of the light guide plate, comprising transparent adhesive and diffusion particles scattered in the transparent adhesive;
    a brightening layer adhered to the diffusion layer, comprising a micro structure positioned on a surface of the brightening layer and facing away from the diffusion layer, the micro structure comprising a number of cutouts; and
    a diffusion film adjacent to the surface of the brightening layer having the micro structure, the diffusion film comprising a transparent film and diffusion particles coated on the transparent film.

2. The light guide device of claim 1, wherein the cutouts are V-shaped.

3. The light guide device of claim 1, further comprising a reflective sheet adjacent to the first surface of the light guide plate, the reflective sheet comprising a transparent substrate and a reflective film coated on the transparent substrate.

4. A method for manufacturing a light guide device, comprising steps of:
    dispensing transparent adhesive mixed with diffusion particles on a light guide plate;
    put a brightening film on the transparent adhesive;

heating to make the light guide plate and the brightening film soft; and pressing the light guide plate and the brightening film at the same time to eliminate gaps existed between the light guide plate, the transparent adhesive, and the brightening film, and to form diffusion pots on the light guide plate, to form a micro structure on the brightening film, wherein the micro structure comprises a number of cutouts.

5. The method of claim 4, further comprising a step of putting the light guide plate on a transmission device before dispensing the transparent adhesive on the light guide plate.

6. The method of claim 4, wherein in the step of heating the light guide plate and the brightening film, the heating temperature is in the range of about 130° C. to about 160° C.

7. The method of claim 4, wherein in the step of pressing the light guide plate and the brightening film, the light guide plate and the brightening film pass through a gap existed between a pair of rotated rollers and are pressed by the pair of rollers.

\* \* \* \* \*